United States Patent
Zhang et al.

(10) Patent No.: US 11,221,998 B2
(45) Date of Patent: Jan. 11, 2022

(54) INGESTING AND PROCESSING CONTENT TYPES

(71) Applicant: Microsoft Technology Licensing, LLC, Redmond, WA (US)

(72) Inventors: Yu Zhang, Redmond, WA (US); Ying Xu, Sammamish, WA (US); Darren Shaun Firth, Redmond, WA (US); Nanda Kishore Sreerama, Redmond, WA (US); Aaron Brady O'Callaghan, Seattle, WA (US); James Thomas Godish, Kirkland, WA (US); Zachary Thomas Capehart, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 267 days.

(21) Appl. No.: 16/562,127

(22) Filed: Sep. 5, 2019

(65) Prior Publication Data
US 2020/0379960 A1    Dec. 3, 2020

Related U.S. Application Data

(60) Provisional application No. 62/855,799, filed on May 31, 2019.

(51) Int. Cl.
*G06F 16/21*   (2019.01)
*G06F 40/205*   (2020.01)
(Continued)

(52) U.S. Cl.
CPC .......... *G06F 16/213* (2019.01); *G06F 40/205* (2020.01); *G06Q 10/0633* (2013.01); *H04L 67/22* (2013.01)

(58) Field of Classification Search
CPC .. G06F 16/835; G06F 16/213; G06F 9/45504; G06F 9/547; G06F 40/205; H04L 67/22; G06Q 10/0633
See application file for complete search history.

(56) References Cited

U.S. PATENT DOCUMENTS 7,472,103 B1    12/2008 Yang
8,898,267 B2    11/2014 Slik et al.
(Continued)

FOREIGN PATENT DOCUMENTS

WO    02086697 A2    10/2002

OTHER PUBLICATIONS

"Data Lifecycle on Google Cloud Platform", Retrieved from https://web.archive.org/web/20161115102507/https:/cloud.google.com/solutions/data-lifecycle-cloud-platform, Nov. 15, 2016, 28 Pages.
(Continued)

*Primary Examiner* — Etienne P Leroux
(74) *Attorney, Agent, or Firm* — Ray Quinney & Nebeker; James Bullough

(57) ABSTRACT

The present disclosure generally relates to systems, methods, and computer-readable media for developing and implementing workflows for a variety of data types. For example, systems disclosed herein may receive or otherwise generate a schema object on a schema system including a plurality of schema objects associated with different workflows. The schema object may include user interface behavior data indicating a content type and associated control type. The schema object may further include application programming interface (API) behavior data indicating a binding between a user interface engine and an API engine. The schema object may also include workflow behavior data indicating one or more services for processing the schema object. Moreover, systems described herein may deploy a plurality of parsers on a plurality of processing engines to enable flexibility and dynamic updates to content ingestion lifecycles.

20 Claims, 6 Drawing Sheets

(51) Int. Cl.
    *G06Q 10/06*    (2012.01)
    *H04L 29/08*    (2006.01)

(56)            References Cited

U.S. PATENT DOCUMENTS 9,081,939 B2      7/2015   Snodgrass
    9,489,382 B2     11/2016   Roy et al.
    9,769,504 B2      9/2017   Mao
    2008/0243874 A1*  10/2008  Suthar .................. G06F 40/143
    2009/0006933 A1*   1/2009  Gavrilov ............... G06F 16/213
                                                              714/819
    2014/0279834 A1    9/2014  Tsirogiannis et al.
    2016/0092476 A1    3/2016  Stojanovic et al.
    2018/0165113 A1    6/2018  Sinha et al.

OTHER PUBLICATIONS

Jindal, et al., "INGESTBASE: A Declarative Data Ingestion System", In Journal of Computing Research Repository, Jan. 21, 2017, 12 Pages.

"International Search Report and the Written Opinion Issued in PCT Application No. PCT/US2020/026056", dated Jul. 21, 2020, 12 Pages.

* cited by examiner

INGESTING AND PROCESSING CONTENT TYPES

CROSS-REFERENCE TO RELATED APPLICATIONS

This application claims the benefit of U.S. Provisional Patent Application No. 62/855,799, filed May 31, 2019, which is hereby incorporated by reference in its entirety.

BACKGROUND

Recent years have seen rapid development in computing technology, particularly in the capabilities of processing various types of data. For example, as computing devices and cloud computing systems become more common and complex, developers have found more effective and efficient ways of processing data and providing a wide variety of services to individuals. Indeed, computing devices and systems are now capable of implementing a variety of applications and platforms having the capability of processing an ever-increasing number of different data types.

As computing systems have increased in complexity and as computing capabilities continue to expand, conventional systems for developing tools and workflow features have failed to keep up with the increasing demand for an ever-increasing number of content types. Indeed, as different content types are introduced, conventional systems often involve redesigns, code changes, additional deployments, integration testing, and further roll out for each discrete content type. As a result, conventional systems and tools for developing processing applications have resulted in frustration for developers and significant time spent developing workflows for processing different types of data.

DETAILED DESCRIPTION

Figure 1:
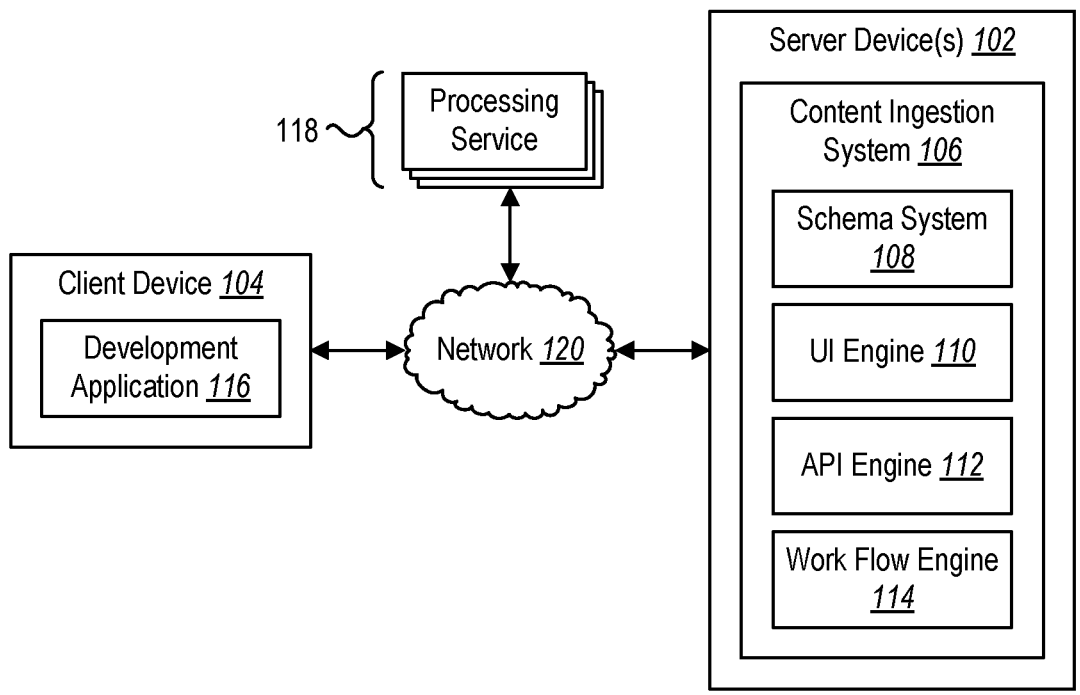
FIG. 1 illustrates an example environment including a content ingestion system in accordance with one or more implementations.

The present disclosure generally relates to systems, methods, and computer-readable media for developing and implementing content ingestion lifecycles for an ever-increasing number of content types. For example, one or more implementations described herein include a content ingestion system to facilitate scalable development of workflows for processing a variety of data types according to content behavior data defined by a schema object. For instance, systems described herein may receive or otherwise generate a schema object on a schema system and add the schema object to a plurality of schema objects associated with different workflows. The schema object may include content behavior data associated with processing the content across a plurality of processing engines.

For example, the schema object may include user interface behavior data indicating a content type and associated control type. The schema object may further include application programming interface (API) behavior data indicating a binding between a user interface engine and an API engine. The schema object may also include workflow behavior data indicating one or more services for processing the schema object. Moreover, systems described herein may deploy a plurality of parsers on a plurality of processing engines (e.g., the user interface engine, an API engine, and a workflow engine).

Implementations of the present disclosure provide benefits and/or solve one or more problems associated with implementing various attributes or schemas having different data types across different applications and platforms. For example, by generating and maintaining schema objects on a schema system (e.g., a centralized system), user interface behavior data, API behavior data, and workflow behavior data may be maintained and associated on a uniform system and using a uniform schema to enable discrete and independent engines to cooperatively implement features and functionality for a variety of schema objects. Indeed, as will be discussed in further detail below, the schema system may include information associating respective data types and behaviors or semantics with corresponding processes and communicate with respective processing engines to implement series of steps defined by the schema objects for corresponding user interface (UI) elements.

As will be further discussed, the schema system may deploy parsers to respective processing engines including instructions for communicating with the schema system and obtaining and/or parsing information for implementing functionalities of the respective processing engines with respect to specific schema objects. For example, a first parser may be provided and deployed on a UI engine to parse user interface behavior data from the schema system. A second parser may be provided and deployed on an API engine to parse API behavior data from the schema system. In addition, one or multiple parsers may be deployed to a workflow engine to parse workflow behavior information from the schema system. In this way, developers can provide implementation instructions defined by schema objects including content behavior data on the different processing engines to the schema system rather than write or develop code for individual engines of the content ingestion system. Indeed, by deploying parsers to individual processing engines capable of interpreting instructions on the schema system, the systems described herein significantly enhance scaling capabilities of the content ingestion system with respect to attributes of different data types.

As illustrated in the foregoing discussion and as will be discussed in further detail herein, the present disclosure utilizes a variety of terms to describe features and advantages of the content ingestion system. For example, as will be discussed in further detail below, a schema system may include semantics and schema to define content specific behaviors (e.g., semantics) including UI experience data, API data model(s), and integration interfaces and policies. Indeed, for schema objects corresponding to different data types defined within a schema system, the schema system may include UI experience schema (e.g., UI behavior data) that defines how content is rendered for corresponding UI controls, validation policies, layout, and localization. The schema system may further include API data model schema (e.g., API behavior data) that defines or otherwise includes a dynamic model for supporting any attribute through CRUD and other customizable operations with applicable validations, provisioning, and transformation policies. The schema system may further include integration interface schema that defines or otherwise includes a generic schematized contract for any schema object that may be exchanged among systems in addition to a corresponding process, transformation, and/or policy. The schema system may further include workflow definition schema (e.g., workflow behavior data) that defines how specific attributes flow through corresponding steps to augment or otherwise process content.

As will be further discussed, a lifecycle of a content ingestion system may include a UI system or representation to capture content specific metadata such as listing, package and pricing with suitable user interface controls (e.g., text fields, checkboxes, drop down menus, collections, composite custom controls) as well as validation or constraint rules, layout, and localization data. For example, the content ingestion system may include a UI engine that renders UI schema to specific UI controls and layout and enforces validations and constraints in real time. As an example, a schema object may include a drop-down UI control including a listing of countries and validated against a list of supported countries that represent valid inputs.

The content ingestion system may further involve an API system or engine including API design and implementation data for building API create, read, update, delete (CRUD) and custom operations to capture and validate content specific data as well as data transformation, provisioning, and business logic. The API engine may bind inputs with an API data model, perform validation, as well as transform and/or provision policies defined by the schema system in real time. As an example, where a user input is a country input, the API engine can translate the input to domain data in the API data model distortionary and execute an attached validation rule.

The content ingestion system may further involve one or more data models for building an extensive data model for capturing content specific data with proper data types, constraints, and relationships. The content ingestion system may also include an integration of systems (e.g., internal and/or external system) to build integration interface/adaptable contracts with external systems applicable to process specific content types such as package augmentation, validation, and extraction. This may include interface elements to translate schema to a generic interface for contracting with external and internal systems as well as execute specific execution policies specified in schema in real time. As an example, an uploaded package file may need to be sent to an external API specified by a policy from the schema system.

The content ingestion system may further include a workflow system or engine for processing contents in a variety of ways. This may include building different workflow definitions or steps applicable to manage and process different content types. The workflow engine may define how attributes captured in the UI, workflow, and API as defined in the schema system flow to corresponding steps performed or executed by workflow processors.

As mentioned above and as discussed in further detail below, each of the processing engines may include parsers deployed or otherwise implemented thereon. The parsers may include instructions for translating semantics and schema from schema objects defined within the schema system into data entities for processing and flowing through components (e.g., processing engines) of the content ingestion system. In one or more implementations, the parsers include shared libraries that enable the respective engines to parse or otherwise interpret behavior information stored on the schema system.

As discussed above, example implementations of the content ingestion system described herein provide unique schema driven behaviors that are reflected in real time for features and functionality described herein to provide an agile, extensible, and centralized mechanism to update and onboard content types for a full lifecycle. Indeed, rather than requiring that a developer design, change code, perform individual engine deployments, perform integration testing, and roll out every new attribute or datatype, examples of the content ingestion system described herein provide a schema-driven UI representation that includes an end-to-end design to cover all components (e.g., processing engines) of an entire lifecycle for content ingestion in a uniform and scalable way.

In one or more implementations, the content ingestion system may further include a management interface to manage schemas represented within respective schema objects for features and aspects described herein. For example, a management interface may refer to an application implemented on a client device and/or on a server device that provides an interface to the schema system to enable individuals and/or businesses to configure schemas and updates to be reflected for a content ingestion lifecycle in real-time and/or at a scheduled time. Further, the management interface provides controls to enable an individual to generate and modify schema objects in accordance with rules or constraints that comply with restrictions and realities of components of the content ingestion system.

Additional detail will now be provided regarding systems described herein in relation to illustrative figures portraying example implementations. For example, FIG. 1 illustrates an example environment 100 for implementing a data ingestion system in accordance with one or more embodiments described herein. As shown in FIG. 1, an environment 100 includes one or more server device(s) 102, a client device 104 and any number of processing services 118. As shown in FIG. 1, the server device(s) 102 may include a content ingestion system 106 which includes a schema system 108, a UI engine 110, an API engine 112, and a workflow engine 114. As further shown, the client device 104 may include a development application 116 implemented thereon.

The server device(s) 102, client device 104, and processing services 118 may communicate with each other directly or indirectly through a network 120. The network 120 may include one or multiple networks and may use one or more communication platforms or technologies suitable for transmitting data. The network 120 may refer to any data link that enables the transport of electronic data between devices and/or modules of the environment 100. The network 120 may refer to a hardwired network, a wireless network, or a combination of a hardwired and a wireless network. In one or more embodiments, the network 120 includes the Internet.

The client device 104 may refer to various types of computing devices. For example, the client device 104 may include a mobile device such as a mobile telephone, a smartphone, a personal digital assistant (PDA), a tablet, or a laptop. Additionally, or alternatively, the client device 104 may include a non-mobile device such as a desktop computer, server device, or other non-portable device. The server device(s) 102 may similarly refer to various types of computing devices. In one or more implementations, the server device(s) 102 refers to devices of a cloud computing system.

Moreover, in one or more embodiments, each of the systems and/or services described herein may be implemented on one or more different devices of the cloud computing system. Each of the devices of the environment 100 may include features and functionality described generally below in connection with FIG. 5.

As mentioned above, the content ingestion system 106 may include a schema system 108 that maintains a record of schema objects that define processing behaviors of components of the content ingestion system 106 with respect to corresponding data types or attributes. For example, the schema system 108 may include schema objects including UI behavior data, API behavior data, and workflow behavior data. In one or more implementations, the schema object refers to a JavaScript Object Notation (JSON) file including data that may be read or otherwise interpreted using a parser. Moreover, the schema system 108 may facilitate deployment of parsers on respective processing engines that enable the content processing engines to interpret instructions and other information maintained and provided by the schema system 108.

As shown in FIG. 1, the content ingestion system 106 includes processing engines including a UI engine 110, an API engine 112, and a workflow engine 114. As will be discussed in further detail below, the UI engine 110 may include a parser for interpreting UI behavior data to enable the UI engine 110 to render UI controls and layouts as well as enforce validations and constraints defined within the schema system 108. In addition, the API engine 112 may include a parser for interpreting API behavior data to enable the API engine 112 to bind behaviors and build various API operations to capture and validate content specific data and other API-related behaviors. The workflow engine 114 may similarly include one or more parsers (e.g., a parser for each of a plurality of workflow processors) to similarly interpret workflow behavior information to perform various actions as well as invoke processing services 118 in order to process or otherwise ingest different data types.

In one or more embodiments, the processing services 118 refer to third-party processing services including instructions to perform any number of tasks or processes and implemented on third-party devices (e.g., devices other than the network of devices that make up the server device(s) 102). In addition, or as an alternative, in one or more implementations, the processing services 118 refer to a combination of third-party services and services provided by a network of devices included within the server device(s) 102 (e.g., services of a cloud computing system on which the content ingestion system 106 is also implemented).

In one or more embodiments, the content ingestion system 106 may include a development management interface that enables a client device 104 to interact with and provide instructions for creating processing instructions for different data types. For example, in one or more embodiments, the content ingestion system 106 includes a toolkit or other development tool or interface that provides controls and constraints that enable a developer (e.g., a user of the client device 104) to generate or otherwise create schema objects and define behavior data for different schema objects. For instance, as illustrated in FIG. 1, the client device 104 may include a development application 116 that includes controls or a software tool that enables the client device 104 to create, update, or otherwise manage entries (e.g., schema objects) of the schema system 108 to facilitate a uniform approach for generating and developing new processing workflows for ingesting and processing data types.

In one or more embodiments, the development application 116 provides controls and tools via a program installed on the client device 104. In one or more embodiments, the development application 116 refers to a web portal or application accessible via a web browser application that provides controls and tools discussed herein in connection with generating and implementing schema objects on the content ingestion system 106.

The components 106-116 of the systems described herein can include software, hardware, or both. For example, the components 106-116 of the systems described herein can include one or more instructions stored on a computer-readable storage medium and executable by processors of one or more computing devices (e.g., server device(s)). When executed by computer-executable instructions, the various systems and engines described herein can perform one or more methods or series of acts described herein. Alternatively, the components 106-116 may include hardware, such as a special purpose processing device to perform a certain function or group of functions. In addition, or as an alternative, the components 106-116 may include a combination of computer-executable instructions and hardware.

FIG. 1 illustrates an example arrangement of devices and components in accordance with one or more embodiments. For example, the content ingestion system 106 may be implemented in whole or in part on one or more server device(s) 102 that are part of a cloud computing system including a distributed network of server devices. Alternatively, in one or more implementations, the content ingestion system 106 is implemented in whole or in part on a different system or network of devices. For example, the content ingestion system 106 may be implemented wholly or partially on a client device, third-party server device, a different cloud computing system, or other computing devices. In addition, while one or more of the processing services 118 may be provided via a third-party server (e.g., as shown in FIG. 1), one or more of the processing services 118 may be implemented on a common network of devices as the content ingestion system 106.

Figure 2:
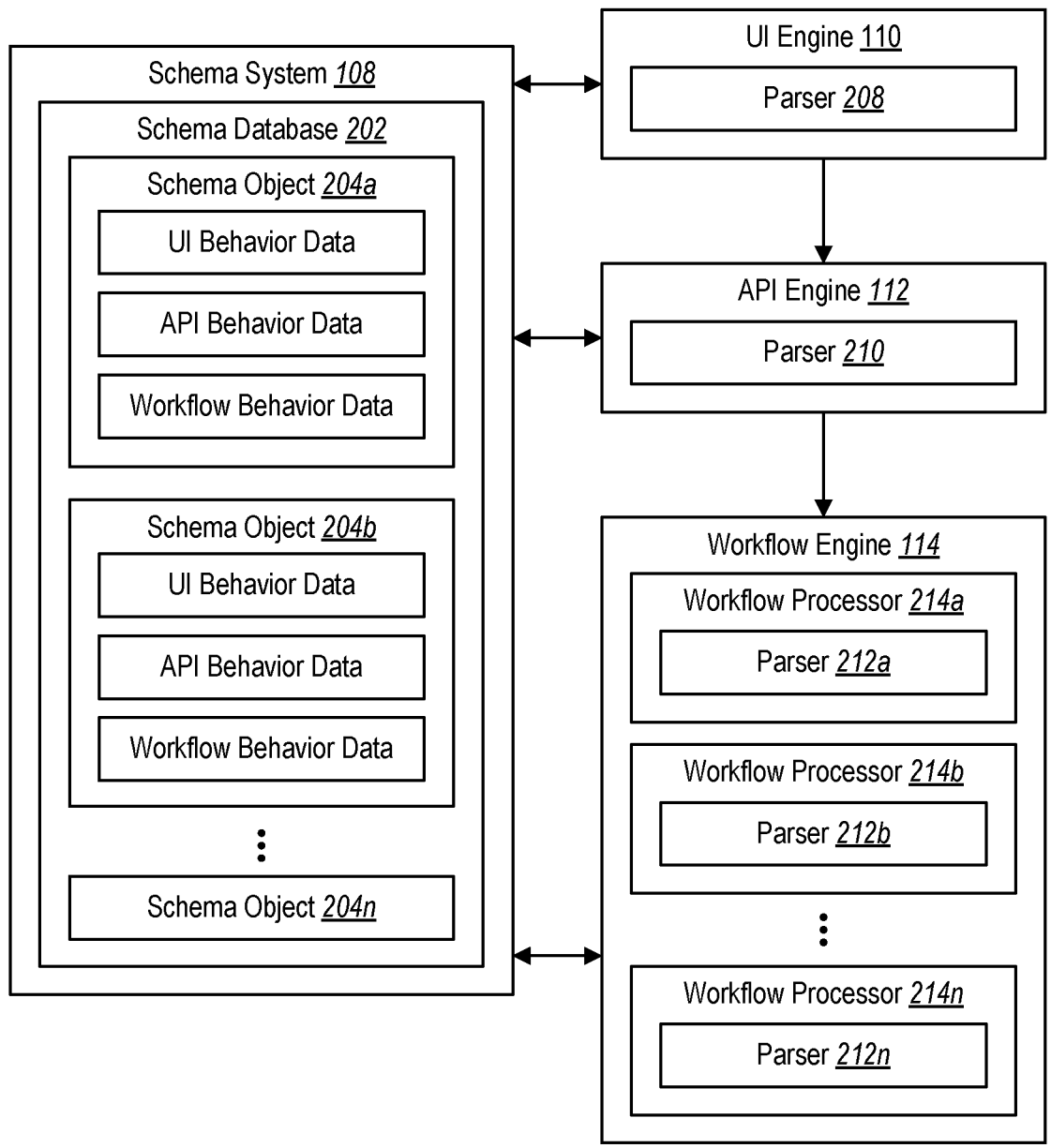
FIG. 2 illustrates an example implementation of a schema system in conjunction with a user interface engine, an application programming interface (API) engine, and a workflow engine in accordance with one or more implementations.

Additional detail with regard to generating schema objects and implementing a content ingestion workflow for an associated data type will now be described in connection with FIG. 2. For example, FIG. 2 illustrates an example implementation of a schema system 108 include a schema database 202 having a plurality of schema objects 204a-n maintained thereon. In particular, the schema database 202 may include a first schema object 204a for a first content type including behavior data associated with a content ingestion workflow. In the example shown in FIG. 2, the behavior data includes user interface (UI) behavior data, API behavior data, and workflow behavior data.

As shown in FIG. 2, the schema database 202 may include any number of schema objects 204a-n including associated behavior data for any number of corresponding content types. For example, in addition to the first schema object 204a, the schema database 202 includes a second schema object 204b having associated behavior data including UI behavior data, API behavior data, and workflow behavior data. As further illustrated, the schema database 202 includes a plurality of schema objects up to an Nth schema object 204n having associated behavior data including UI behavior data, API behavior data, and workflow behavior data.

In one or more embodiments, the schema system 108 generates schema objects and adds the schema objects to a schema database 202 for a plurality of corresponding data-types based on information received from a client device.

For example, in one or more embodiments, the schema system 108 interacts with a toolkit or other development tool (e.g., a management interface) implemented as a part of the schema system 108 or as part of a development application 116 on the client device 104. The toolkit of the schema system 108 may enable an individual (e.g., a developer) to create schema objects including user-defined behaviors in accordance with parameters and settings that the schema system 108 and processing engines are equipped or otherwise configured to interpret and process.

As shown in FIG. 2, a plurality of parsers may be deployed or otherwise implemented on the processing engines. For example, a first parser 208 may be deployed on a UI engine 110. A second parser 210 may be deployed on the API engine 112. Additional parsers 212 may be deployed on the workflow engine 114. In particular, the workflow engine 114 may include one or multiple workflow processors 210a-n having corresponding parsers 212a-n deployed thereon. Indeed, each of the workflow processors 214a-n may include a respective parser from the additional parsers 212a-n deployed on the workflow engine 114.

As mentioned above, the parsers 208-212 facilitate interpretation of behavior data from the schema database 202. For example, the first parser 208 may include a shared library that enables the UI engine 110 to parse UI behavior data from one or more of the schema objects 204a-n maintained on the schema system 108. The second parser 210 may similarly include a shared library (e.g., the same shared library or a different shared library) that enables the API engine 112 to parse API behavior data from one or more of the schema objects 204a-n. Moreover, the additional parsers 212 may include shared libraries (e.g., the same or different shared libraries) that enable the workflow processors 214a-n to parse workflow behavior data from one or more of the schema objects 204a-n.

As mentioned above, by deploying parsers 208-212 to each of the processing engines, content ingestion processes for corresponding data types may be modified at a central location without independently creating, developing, updating, and testing code at each of the respective processing engines. Indeed, a developer may update the behavior data for a corresponding schema object for a content type to modify how data is processed, transformed, or otherwise consumed at any stage of the ingestion lifecycle by providing instructions to the schema system 108 that can be parsed or otherwise interpreted using the parsers 208-212 deployed on the corresponding processing engines. Moreover, behavior data for any of the discrete types of behavior data specific to the respective processing engines may be modified without modifying or writing code to be implemented on the corresponding processing engine or other processing engines.

Figure 3A:
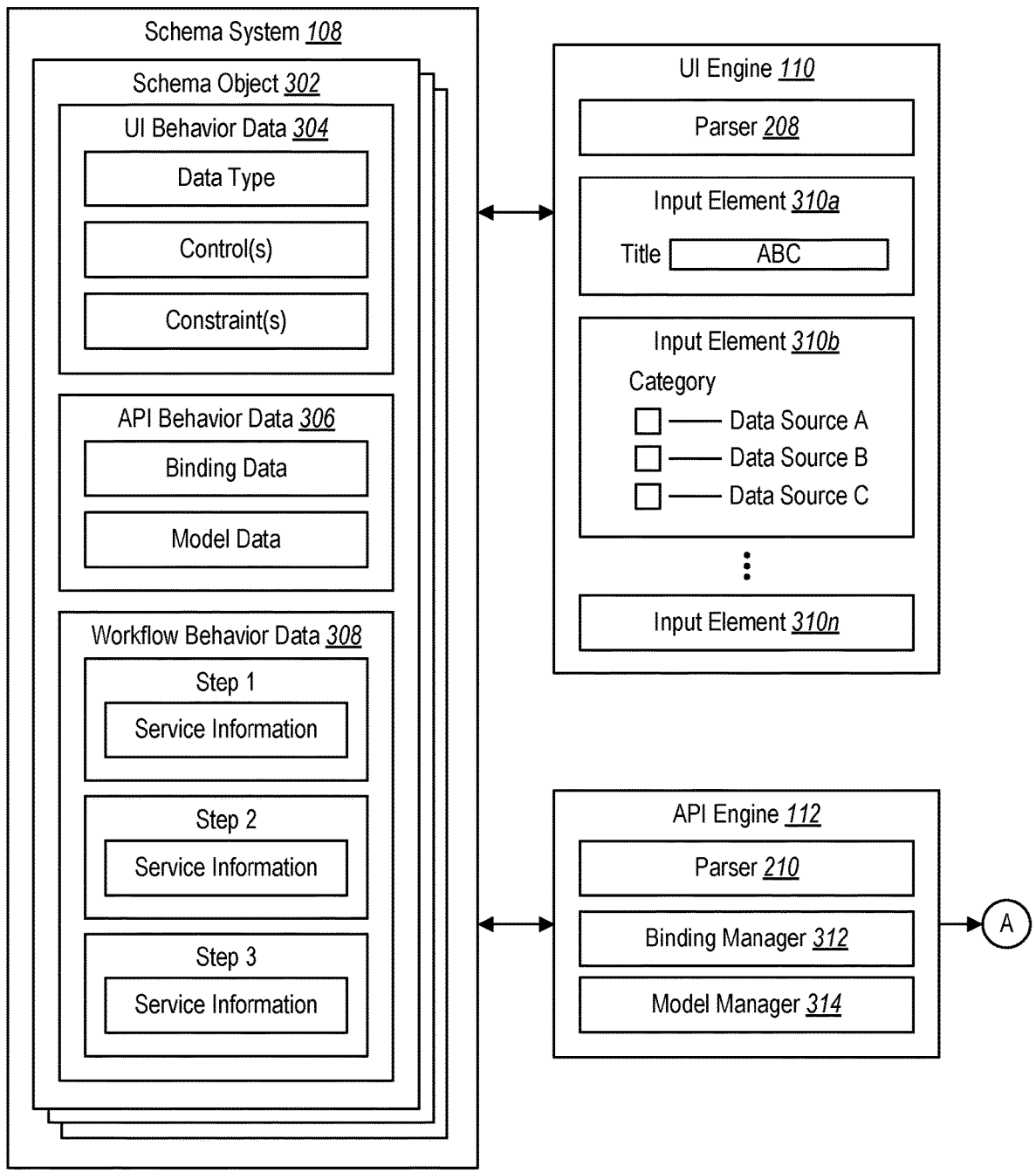
FIGS. 3A-3B illustrate an example implementation of a schema object including user interface behavior data, API behavior data, and workflow behavior data in accordance with one or more implementations.
Figure 3B:
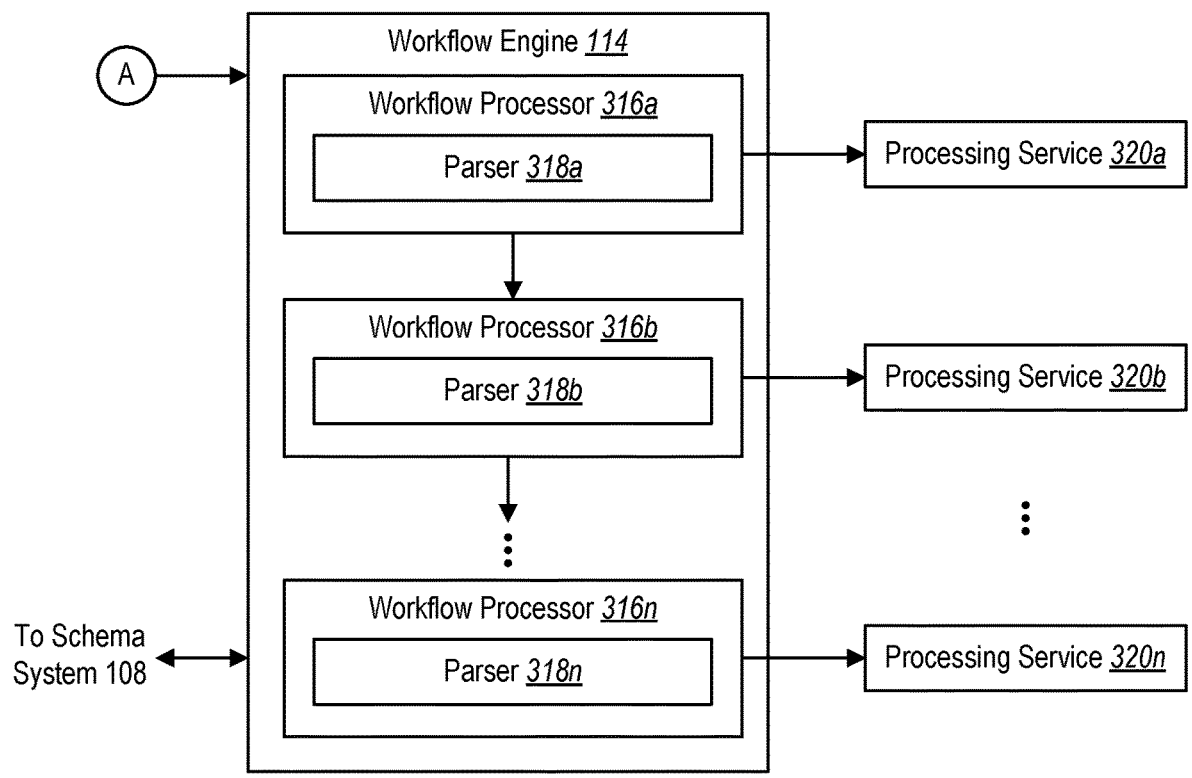

Moving onto FIGS. 3A-3B, further detail is provided in connection with example schema objects in accordance with one or more embodiments described herein. For example, FIG. 3A illustrates an example schema system 108 including a plurality of schema objects having associated behaviors defined therein. For example, a first schema object 302 may include UI behavior data 304, API behavior data 306, and workflow behavior data 308.

In connection with the example first schema object 302, the user interface behavior data 304 may include an identified data type, an identified user control, and one or more constraints. As an example, for a title attribute including a string to be entered within an input text field, the identified data type may indicate a string while the user control indicates a text field. The behavior data 304 may include one or more constraints such as a maximum string length of 100 characters or any other non-compatible input corresponding to the identified input type.

As further shown, the schema object 302 includes API behavior data 306 including binding data, model data, or other API-related data to facilitate performing a variety of operations using the API engine. For instance, binding data may include information for binding inputs with a corresponding API data model. As a further example, the model data may include information about the API data model including information associated with performing validations, transforming and/or provisioning policies, and identified operations (e.g., CRUD operations, custom operations), and other associated information for processing a particular input type. As an example, where a user input is a country, the API behavior data 306 may include information associated with translating the selected input to domain data defined by an API data model.

The workflow behavior data 308 may include information for any number of steps to be performed with respect to a corresponding input type. As an example, the schema object 302 indicates a series of three steps (steps 1-3) to be performed for an input defined by the associated UI behavior data 304. The steps may include processes such as scanning content to identify intrusive content. As another example, the steps may include applying UI rendering to enrich a field or applying a style to a user interface based on received input. Indeed, the series of steps may include information associated with performing any number of processes in response to a received input of the corresponding input type.

As further shown, each of the steps may include an identification of a processing service for processing or otherwise performing the corresponding step or function. For example, step one may include service information referencing a first service, step two may include service information referencing a second service, and step three may include service information referencing a third service where each of the services perform corresponding actions or functions in response to receiving an input associated with the schema object 302. As mentioned above, the steps may reference third-party processing services such as a third-party system trained to identify intrusive content or a third-party system including instructions for enriching a field or element of a user interface.

The service information for the corresponding steps may include any information that enables a workflow engine (e.g., a workflow processor of the workflow engine) to access a processing service. For example, the service information may include a link or location (e.g., a URL) for accessing the processing service. The service information may include data to provide for requesting performance or execution of the processing service.

In one or more embodiments, a developer may modify workflow behavior for a corresponding input or input type by modifying the series of steps and associated service information on the schema system 108. For example, the workflow may be modified by adding steps, modifying service information, changing an order of existing steps, or otherwise modifying the workflow behavior maintained on the schema system 108. Indeed, as further processing services are made available or where a developer wishes to add additional steps to be performed for a corresponding input, the developer may simply add steps and associated service information to the schema object 302 on the schema system 108 without deleting, adding, or otherwise modifying code on the different processing engines as would generally be involved in implementation of conventional content ingestion systems.

As discussed above, and as shown in FIG. 3A, the UI engine 110 includes a parser 208 for interpreting UI behavior data 304 of the schema object 302. As mentioned above, the parser 208 may include a shared library including parsing information and other information to enable the UI engine 110 to render various UI elements via a graphical user interface in a way defined by the schema object 302. For example, with respect to a first schema object, the UI engine 110 may parse UI behavior data to render a first input element 310a for a title data type and a text field control type. As shown in FIG. 3A, the input element 310a includes a title data type including a text field within a string of text or numbers may be entered. Where the input complies with the constraints from the associated behavior data, the input may be declared valid and provided to an API engine 112 for further processing.

FIG. 3A illustrates additional example input elements 310b-n. For example, a second input element 310b may include a category data type including a dropdown menu of selectable categories. The behavior information may indicate the displayed categories as well as an appearance of the categories to be parsed by the UI engine 110 and rendered in accordance with the UI behavior information. As shown in FIG. 3B, the selected categories may correspond to different data sources, which may be identified within the UI behavior data and/or API behavior data to enable the API engine 112 to generate data for requesting access to a data source corresponding to a selected input element.

As further shown in FIG. 3A, the API engine 112 includes a parser 210 for interpreting behavior information received from the schema system 108. In addition, the API engine 112 may include a binding manager 312 for binding inputs with corresponding API data models. The API engine 112 may further include a model manager 314 for processing, enhancing, or otherwise ingesting data received from the UI engine in response to an input provided by the UI engine 110. It will be appreciated that the binding between the UI engine 110 and the API engine 112 is stored or otherwise maintained on the schema system 108. Accordingly, contract behaviors associated with corresponding content types may be dynamically changed by updating UI behavior data and corresponding API behavior data.

As shown in FIGS. 3A-3B, the API engine 112 may provide data (e.g., enhanced, transformed, or otherwise processed data) in accordance with the data model to the workflow engine for further processing. As shown in FIG. 3B, the workflow engine may include any number of workflow processors 316a-n including parsers 318a-n implemented thereon. The parsers 318a-n may enable the respective workflow processors 316a-n to interpret behavior data from the schema objects.

As discussed above, the workflow behavior information may include information referencing and enabling the respective workflow processors 316a-n to request or otherwise access processing services 320a-n in accordance with the series of steps identified in the associated workflow behavior information. For example, where the workflow behavior information identifies a series of steps including a first step associated with the first workflow processor and first processing service 320a and a second step that indicates the second workflow processor and second processing service 320b, the first workflow processor 316a may invoke, request, or otherwise access the processing service 320a for ingesting or otherwise processing an input. Further, the second workflow processor 316b may access the second processing service 320b in accordance with corresponding workflow behavior information.

In one or more embodiments, the various processing steps may be grouped by workflow processor. For example, where certain steps are indicated across different schema objects, the steps may reference the same workflow processor. Accordingly, the same workflow processor or group of workflow processors may be referenced by different series of steps corresponding to different content types (e.g., within different schema objects).

Similar to the UI engine 110 and the API engine 112 discussed above, the workflow engine 114 may similarly maintain a communication link with the schema system 108 to enable the parsers to receive and interpret data from the centralized database maintained by the schema system 108. In this way, a developer may provide comprehensive workflow behavior data on a central database of the schema system 108 rather than deploying code or other instructions on each of the respective workflow processors.

As mentioned above, the behavior data corresponding to the respective engines may include information linking inputs to corresponding data models and associated workflow processors (which may be associated with corresponding processing services). For example, the behavior information (e.g., the UI behavior information, API behavior information, and/or workflow behavior information) may include binding information between the user interface engine and the API engine. Moreover, the behavior information may include an indication of a step associated with a corresponding workflow processor that informs the API engine how data received from the user interface engine should be enhanced, transformed or otherwise processed as well as which data should be provided to the workflow engine for use in accessing a processing service.

Moreover, while one or more embodiments described herein relate specifically to implementing a workflow for ingesting or otherwise processing data of a new content type, the features and functionality described herein in connection with creating a workflow process for ingesting data for the new content type may similarly apply to ingesting and processing content types added to existing products. For example, where an application (e.g., a software product) includes a collection of previously developed services (e.g., where code is implemented on corresponding processing engines), the schema system 108 may be used to onboard processes and services for new features of the application to supplement already existing and developed features of the application.

For example, the content ingestion system 106 may deploy a parser to a UI engine, API engine, and workflow engine to enhance capabilities of those respective processing engines to process inputs corresponding to new datatypes for which the UI engine, API engine, and workflow engine have not been configured to process or otherwise ingest. In this way, workflows for new datatypes may be added to an existing product or already developed workflows using the schema system 108 without modifying previously developed workflows or redeveloping an application from scratch.

Moreover, by providing a schema system 108 including a central database of schema objects, first and third-party developers can access tools for publishing a wide variety of content via a marketplace. For instance, features and functionalities described herein may relate across different applications such as games, business applications, cloud portals, storefronts, etc. that each have different content types associated with different workflows for processing content of the different content types. Moreover, because the schema system provides controls for defining schema objects in a uniform way, the systems described herein provide scalability that is not available in traditional application development and content ingestion systems.

Figure 4:
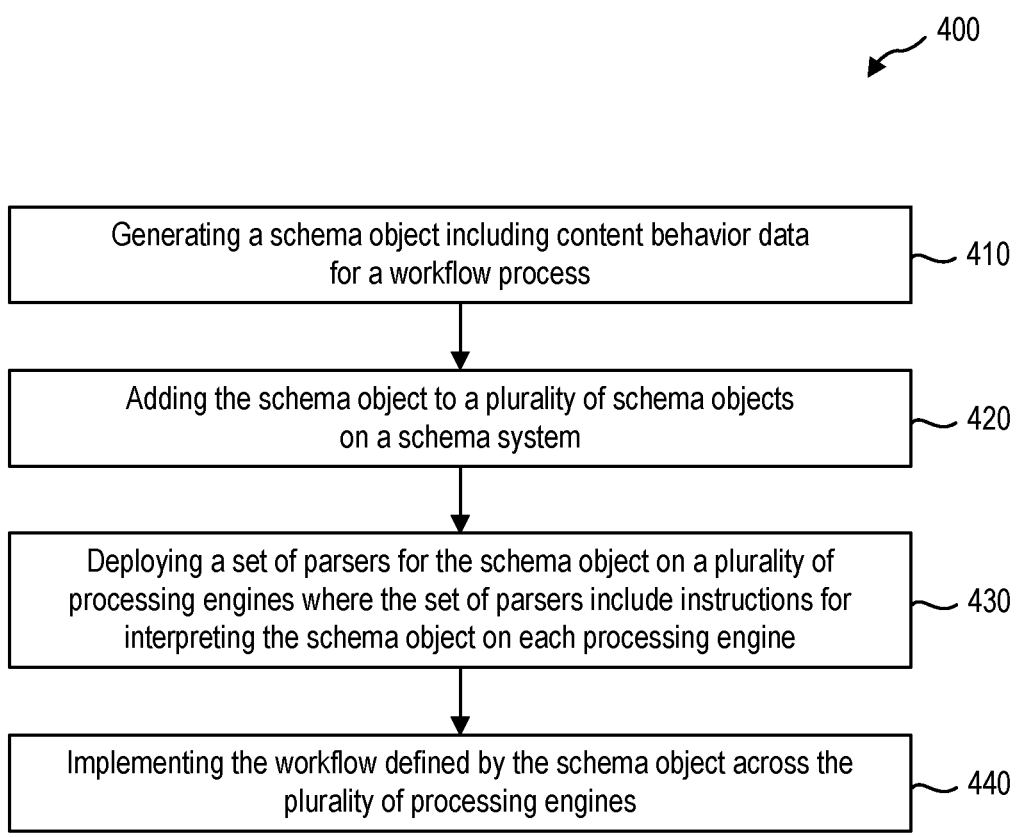
FIG. 4 illustrates an example method for implementing a schema system in accordance with one or more implementations.

Turning now to FIG. 4, this figure illustrates an example flowchart including a series of acts for implementing a content ingestion system including a schema system in accordance with one or more implementations described herein. While FIG. 4 illustrates acts according to one or more embodiments, alternative embodiments may omit, add to, reorder, and/or modify any of the acts shown in FIG. 4. The acts of FIG. 4 can be performed as part of a method. Alternatively, a non-transitory computer-readable medium can comprise instructions that, when executed by one or more processors, cause a server device to perform the acts of FIG. 4. In still further embodiments, a system can perform the acts of FIG. 4.

FIG. 4 illustrates a series of acts 400 associated with creating and implementing a schema object defining content behavior data for ingesting content of a corresponding content type. As shown in FIG. 4, the series of acts 400 includes an act 410 of generating a schema object including content behavior data for a workflow process. For example, the act 410 may include generating a schema object associated with a workflow process where the schema object includes content behavior data associated with first content for each processing engine of a plurality of processing engines.

In one or more embodiments, the content behavior data includes behavior data associated with the corresponding processing engines. For example, the content behavior data may include user interface behavior data indicating a content type of the first content. In one or more embodiments, the user interface behavior data includes one or more input constraints limiting an input that the user interface engine can process. The content behavior data may further include application programming interface (API) behavior data indicating a binding between a user interface engine and an API engine. The content behavior data may further include workflow behavior data indicating one or more services for processing the schema object.

As further shown, the series of acts 400 may include an act 420 of adding the schema object to a plurality of schema objects on a schema system. For example, the act 420 may include adding the schema object to a plurality of schema objects on a schema system where the plurality of schema objects includes content behavior data associated with a plurality of content. In one or more embodiments, the schema object is associated with a workflow to be implemented in connection with an existing application developed independent from the schema system. Moreover, in one or more embodiments, the schema object includes a JavaScript Object Notation (JSON) file stored on a central schema system.

The series of acts 400 may also include an act 430 of deploying a set of parsers for the schema object on a plurality of processing engines where the set of parsers include instructions for interpreting the schema object on each processing engine. For example, in one or more embodiments, the act 430 includes deploying, for the schema object, a set of parsers on the plurality of processing engines where the set of parsers include instructions for interpreting the schema object on the schema system and where the set of parsers includes at least one parser on each processing engine of the plurality of processing engines. In one or more embodiments, deploying the set of parsers on the plurality of processing engines for the schema object includes deploying a first parser on the user interface engine, deploying a second parser on the API engine, and deploying one or more additional parsers on a workflow engine.

In one or more embodiments, the series of acts 400 includes deploying a plurality of parsers on the plurality of processing engines associated with the plurality of schema objects on the schema system. In one or more embodiments, the plurality of parsers includes instructions for interpreting the plurality of schema objects. In one or more embodiments, the plurality of parsers includes at least one shared library deployed to each processing engine of the plurality of processing engines. In one or more embodiments, the set of parsers includes instructions for interpreting the schema object and the set of parsers includes at least one shared library deployed to each processing engine of the plurality of processing engines.

In one or more embodiments, the workflow behavior data indicates a series of processing steps to be performed in response to an input associated with the schema object. The workflow engine may include multiple workflow processors where each workflow processor from the multiple workflow processors have corresponding parser from the set of parsers deployed thereon. Moreover, the workflow behavior data may include, for each processing step of a series of multiple processing steps, an identification of a corresponding service for executing at least one process. The one or more services identified by the workload behavior data may include third-party services invoked by workflow processors of the workflow engine.

In one or more embodiments, the plurality of schema objects includes a second schema object corresponding to a different content type than a content type of the schema object. In one or more embodiments, the second schema object includes additional user interface behavior data indicating the different content type and associated control type, additional application programming interface (API) behavior data indicating another binding between the user interface engine and the API engine, and additional workflow behavior data indicating a different set of one or more services for processing the second schema object.

As further shown, the series of acts 400 may include an act 440 may include implementing the workflow defined by the schema object across the plurality of processing engines. For example, the act 440 may include ingesting content of the corresponding content type in accordance with behavior data defined by the schema object and using the plurality of processing engines.

In one or more embodiments, the series of acts 400 include receiving an update for the schema object indicating a change to the content behavior data stored on the schema system. In one or more embodiments, the series of acts 400 includes updating a deployment of the set of parsers on the plurality of processing engines to include instructions for interpreting an updated schema object based on the update for the schema object.

Figure 5:
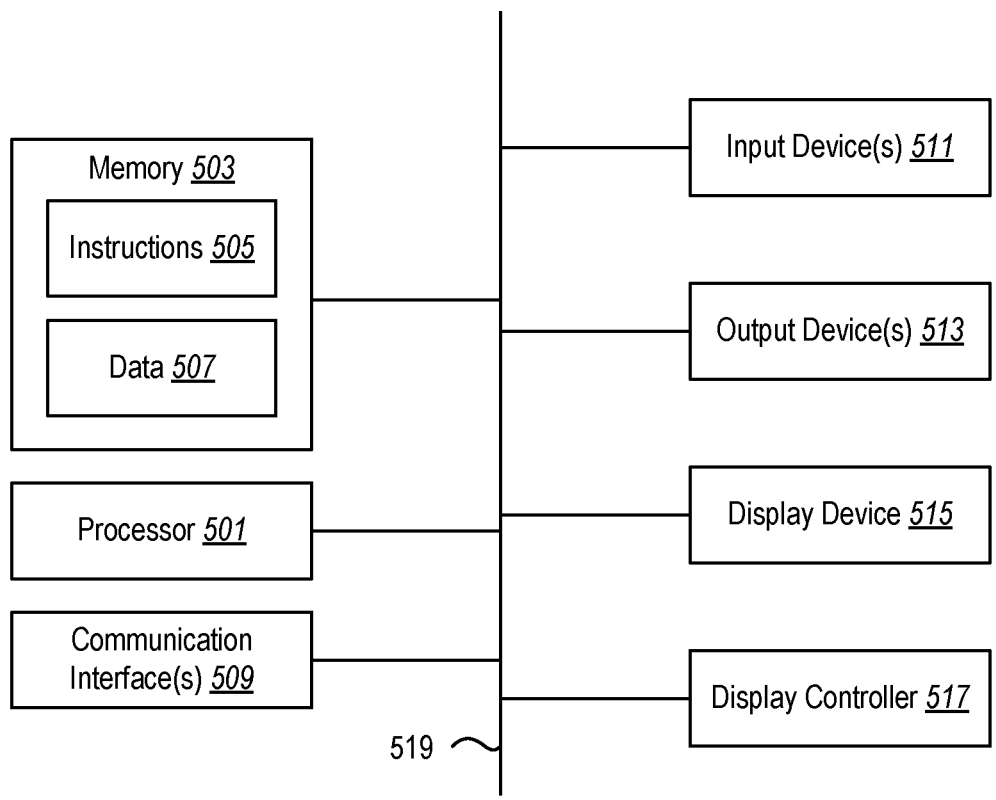
FIG. 5 illustrates certain components that may be included within a computer system.

FIG. 5 illustrates certain components that may be included within a computer system 500. One or more computer systems 500 may be used to implement the various devices, components, and systems described herein.

The computer system 500 includes a processor 501. The processor 501 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   generating a schema object associated with a workflow process, wherein the schema object includes content behavior data associated with first content for each processing engine of a plurality of processing engines;
   adding the schema object to a plurality of schema objects on a schema system, the plurality of schema objects including content behavior data associated with a plurality of content;
   deploying, for the schema object, a set of parsers on the plurality of processing engines, the set of parsers including instructions for interpreting the schema object on the schema system, wherein the set of parsers comprises at least one parser on each processing engine of the plurality of processing engines.

2. The method of claim 1, wherein the content behavior data comprises:
   user interface behavior data indicating a content type of the first content;
   application programming interface (API) behavior data indicating a binding between a user interface engine and an API engine; and workflow behavior data indicating one or more services for processing the schema object.

3. The method of claim 2, wherein the user interface behavior data further includes one or more input constraints limiting an input that the user interface engine can process.

4. The method of claim 2, wherein the workflow behavior data indicates a series of processing steps to be performed in response to an input associated with the schema object, and wherein the workflow engine comprises multiple workflow processors, each workflow processor from the multiple workflow processors having a corresponding parser from the set of parsers deployed thereon.

5. The method of claim 2, wherein the workflow behavior data includes, for each processing step of a series of multiple processing steps, an identification of a corresponding service for executing at least one process.

6. The method of claim 2, wherein the one or more services identified by the workload behavior data include third-party services invoked by workflow processors of the workflow engine.

7. The method of claim 2, wherein the plurality of schema objects includes a second schema object corresponding to a different content type than a content type of the schema object, wherein the second schema object comprises:
additional user interface behavior data indicating the different content type and associated control type;
additional application programming interface (API) behavior data indicating another binding between the user interface engine and the API engine; and
additional workflow behavior data indicating a different set of one or more services for processing the second schema object.

8. The method of claim 2, wherein deploying the set of parsers on the plurality of processing engines for the schema object comprises:
deploying a first parser on the user interface engine;
deploying a second parser on the API engine; and
deploying one or more additional parsers on a workflow engine.

9. The method of claim 1, further comprising:
receiving an update for the schema object indicating a change to the content behavior data stored on the schema system; and
updating a deployment of the set of parsers on the plurality of processing engines to include instructions for interpreting an updated schema object based on the update for the schema object.

10. The method of claim 1, wherein the set of parsers includes instructions for interpreting the schema object, and wherein the set of parsers includes at least one shared library deployed to each processing engine of the plurality of processing engines.

11. The method of claim 1, wherein the schema object is associated with a workflow to be implemented in connection with an existing application developed independent from the schema system.

12. The method of claim 1, wherein the schema object comprises a JavaScript Object Notation (JSON) file stored on a central schema system.

13. A system, comprising:
one or more processors;
memory in electronic communication with the one or more processors; and
instructions stored in the memory, the instructions being executable by the one or more processors to:
generate a schema object associated with a workflow process, wherein the schema object includes content behavior data associated with a first content, the content behavior data including:
user interface behavior data indicating a content type of the first content;
application programming interface (API) behavior data indicating a binding between a user interface engine and an API engine; and
workflow behavior data indicating one or more services for processing the schema object;
add the schema object to a plurality of schema objects on a schema system, the plurality of schema objects including content behavior data associated with a plurality of content; and
deploy, for the schema object, a set of parsers on a plurality of processing engines, the set of parsers including instructions for interpreting the schema object on the schema system, wherein the set of parsers comprises at least one parser on each processing engine of the plurality of processing engines.

14. The system of claim 13, wherein the plurality of processing engines comprises the user interface engine, the API engine, and a workflow engine, wherein deploying the set of parsers comprises:
deploying a first parser on the user interface engine;
deploying a second parser on the API engine; and
deploying one or more additional parsers on the workflow engine.

15. The system of claim 14, wherein the workflow behavior data indicates a series of processing steps to be performed in response to an input associated with the schema object, and wherein the workflow engine comprises multiple workflow processors, each workflow processor from the multiple workflow processors having a corresponding parser from the set of parsers deployed thereon.

16. The system of claim 13, wherein the user interface behavior data further includes one or more input constraints limiting an input that the user interface engine can process.

17. A system, comprising:
one or more processors;
memory in electronic communication with the one or more processors; and
instructions stored in the memory, the instructions being executable by the one or more processors to:
generate a schema object associated with a workflow process, wherein the schema object includes content behavior data associated with a first content type for each processing engine of a plurality of processing engines;
add the schema object to a plurality of schema objects on a schema system, the plurality of schema objects including content behavior data associated with a plurality of content;
deploy, for the schema object, a set of parsers on the plurality of processing engines, the set of parsers including instructions for interpreting the schema object on the schema system, wherein the set of parsers comprises at least one parser on each processing engine of the plurality of processing engines.

18. The system of claim 17, wherein the content behavior data comprises:
user interface behavior data indicating rendering;
application programming interface (API) behavior data indicating a binding between a user interface engine and an API engine; and
workflow behavior data indicating one or more services for processing the schema object.

19. The system of claim 18, wherein the workflow behavior data indicates a series of processing steps to be performed in response to an input associated with the schema object, and wherein the workflow engine comprises multiple workflow processors, each workflow processor from the multiple workflow processors having a corresponding parser from the set of parsers deployed thereon.

20. The system of claim 17, wherein deploying the set of parsers on the plurality of processing engines for the schema object comprises:
   deploying a first parser on the user interface engine;
   deploying a second parser on the API engine; and
   deploying one or more additional parsers on a workflow engine.

* * * * *